Patented Apr. 10, 1951

2,548,480

UNITED STATES PATENT OFFICE 2,548,480

FUNGICIDAL COMPOSITIONS CONTAINING NITRO-METHANAL PHENYL HYDRAZONES

Allen R. Kittleson, Cranford, and Miller W. Swaney, Westfield, N. J., assignors to Standard Oil Development Company, a corporation of Delaware No Drawing. Application May 22, 1948, Serial No. 28,757

7 Claims. (Cl. 167—30)

This invention relates to new and useful improvements in parasiticidal preparations, and more particularly to improved fungicidal compositions. This invention also relates to methods of protecting organic material subject to attack by low orders of organisms.

It has now been found that nitro methanal aromatic hydrazones and more particularly nitro methanal phenyl and substituted phenyl hydrazones are extremely effective fungicides.

The composition of the compounds of this invention may be represented by the general formula R—NH—N=CH—NO$_2$ in which R is an aromatic or substituted aromatic radical. The preparation of these compounds is known and is given in the literature (Berichte volume 31, page 2626). In general these materials may be made by diazotizing aromatic amines or nuclear substituted aromatic amines and coupling with aliphatic nitro compounds in an alkaline medium.

The compounds of this invention may be applied to parent materials to rid them of harmful organisms and prevent fungus growth and mildew formation. Since these compounds are exceptionally non-phytotoxic they may be applied safely to a wide variety of plants. This is especially true of plants normally susceptible to metal poisoning. Some of the additional parent materials to which they may be applied for protective purposes are leather, wood, fur, wool coated fabrics and other substances, even including animal bodies.

These compounds may best be applied as a diluted dust mixture with a carrier such as clay, talc or bentonite. They may also be applied as a spray in a liquid carrier either as a solution in a solvent, or as a suspension in a non-solvent such as water. When applied as a spray in water it may be desirable to incorporate a wetting agent.

Among the solvents for the compounds of this invention are acetone and aromatic hydrocarbons.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereafter.

Since the compounds of this invention are non-ionic in nature, that is, possessing no groups readily reactive with heavy metals and the like, they are readily compatible with other insecticidal and fungicidal mixtures and also possess a high degree of chemical stability in the atmosphere which makes them ideally suitable for use as agricultural spray residues. They may therefore be admixed with carriers that are themselves active such as other parasiticides, hormones, herbicides, fertilizers and wetting agents. Stomach and contact insecticides such as the arsenates, fluorides, rotenone and the various fish poisons and organic insecticides such as p,p'dichlorodiphenyltrichloroethane, benzenehexachloride and similar products may also be advantageously added.

This invention will be better understood by reference to the following examples of the preparation of the compounds of this invention and their use for the stated purposes.

EXAMPLE I

Preparation of nitro methanal phenylhydrazone 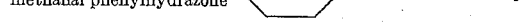

Sodium nitrite (55.2 g.) in 200 cc. of water was added slowly to 74.4 g. of aniline dissolved in 2 liters of water containing 1.6 moles of HCl. The amine hydrochloride solution was maintained at 0–5° C. during the addition. After the diazotization was complete, 298 g. of sodium acetate was added. The above mixture was added rapidly to a cold solution of 48.8 g. of nitromethane and 32 g. of sodium hydroxide in 200 cc. of water. A bright red precipitate formed which was filtered off. The amorphous residue was added to methyl alcohol and filtered, giving 15 g. of a dark reddish powder, nitro methanal phenylhydrazone.

EXAMPLE II

Preparation of nitro methanal p-dimethyl-aminophenylhydrazone 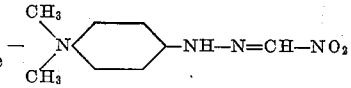

A solution of sodium nitrite (20.7 g.) in 100 cc. of water was added dropwise to 40.6 g. of p-dimethylamino aniline and 0.6 mole of HCl in two liters of water. The amine hydrochloride solution was maintained at 0° C. during the diazotization. After all the NaNO$_2$ had been added, 136 g. of sodium acetate was dissolved in the diazonium chloride solution and the reaction mixture allowed to stand for 30 minutes. The reactants were added rapidly to 18.3 g. of nitromethane and 12 g. of sodium hydroxide dissolved in 200 cc. of cold water. After standing for one hour the solution was filtered. The residue consisted of 20.7 g. of a brown powder.

EXAMPLE III

The phenylhydrazones described above were tested for fungicidal activity by the Slide Germination technique (Wellman and McCallan, Contributions of Boyce Thompson Institute, Vol. 13, No. 3, pages 171-176). The results of these tests are given below:

|  | Concentration of Test Compound to Give Only 50% Spore Germination | |
| --- | --- | --- |
|  | Alternaria solani | Scleratinia fructicola |
|  | Per Cent | Per Cent |
| Nitro Methanal Phenylhydrazone | 0.01 | 0.001 |
| Nitro Methanal p-Dimethylaminophenylhydrazone | 0.01 | 0.001 |

It is to be understood that the invention is not limited to the specific examples which have been offered merely as illustrations and that modifications may be made within the scope of the appended claims without departing from the spirit of the invention.

What is claimed is:

1. A fungicidal composition comprising a hydrazone selected from the group consisting of nitro-methanal phenyl hydrazone and nitro-methanal p-dimethylamino phenyl hydrazone as the active ingredient admixed with a dispersing agent which lowers the surface tension of water and thereby promotes aqueous colloidal dispersions of the hydrazone.

2. A fungicidal composition as in claim 1 in which the hydrazone is nitro-methanal phenyl hydrazone.

3. A fungicidal composition as in claim 1 in which the hyldrazone is nitro-methanal p-dimethylamino phenyl hydrazone.

4. A fungicidal composition as in claim 1 in which the dispersing agent is a surface tension reducing agent for water selected from the group consisting of long-chain alcohol sulfates, sulfonated amide derivatives, sulfonated ester derivatives, sulfonated aromatic derivaties, sulfonated alkyl-aryl derivatives, and petroleum sulfonates of $C_{10}$ to $C_{20}$ length.

5. A fungicidal, aqueous, colloidal dispersion comprising in combination nitro-methanal phenyl hydrazone, water, and a minor proportion of a dispersing agent which lowers the surface tension of water.

6. A fungicidal dust composition comprising nitro-methanal phenyl hydrazone as the active ingredient admixed with powdered clay.

7. A fungicidal dust composition as in claim 6 in which the clay is bentonite.

ALLEN R. KITTLESON
MILLER W. SWANEY.

REFERENCES CITED

The following references are of record in the file of this patent:

UNITED STATES PATENTS

| Number | Name | Date |
| --- | --- | --- |
| 1,562,510 | Lommel | Nov. 24, 1925 |
| 2,191,259 | Pfaff et al. | Feb. 20, 1940 |

OTHER REFERENCES

Bushland, J. Econ. Ent. vol. 33, No. 4, Aug. 1940, pages 670-674.

Bamberger, Berichte, vol. 27, page 159.